(12) United States Patent
Seif et al.

(10) Patent No.: US 10,747,506 B2
(45) Date of Patent: Aug. 18, 2020

(54) CUSTOMIZING OPERATOR NODES FOR GRAPHICAL REPRESENTATIONS OF DATA PROCESSING PIPELINES

(71) Applicant: SAP SE, Walldorf (DE)

(72) Inventors: Simon Seif, Heidelberg (DE); Boris Gruschko, Heidelberg (DE); Joachim Fitzer, Schriesheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/009,987

(22) Filed: Jun. 15, 2018

(65) Prior Publication Data

US 2019/0384577 A1 Dec. 19, 2019

(51) Int. Cl.
| | |
|---|---|
| *G06F 9/44* | (2018.01) |
| *G06F 8/20* | (2018.01) |
| *G06F 8/35* | (2018.01) |
| *G06F 16/22* | (2019.01) |
| *G06F 8/41* | (2018.01) |
| *G06F 15/78* | (2006.01) |

(52) U.S. Cl.
CPC .................. *G06F 8/22* (2013.01); *G06F 8/35* (2013.01); *G06F 8/4452* (2013.01); *G06F 15/7878* (2013.01); *G06F 16/2246* (2019.01)

(58) Field of Classification Search
CPC . G06F 8/22; G06F 8/35; G06F 8/4452; G06F 15/7878
USPC .......................................................... 717/105
See application file for complete search history.

(56) References Cited

U.S. PATENT DOCUMENTS

| | | | | |
|---|---|---|---|---|
| 7,711,527 B2* | 5/2010 | Sabadell | ............... | G06F 16/258 703/2 |
| 8,046,382 B2* | 10/2011 | Valentin | ............ | G06F 16/24573 707/802 |
| 8,280,903 B2* | 10/2012 | Broder | ................ | G06F 17/2785 707/769 |

(Continued)

OTHER PUBLICATIONS

Andrea Ceroni et al.: "QualiMaster—A configurable real-time Data Processing Infrastructure mastering autonomous Quality Adaptation; WP4: Quality-aware Configuration and Adaptation of Stream Processing Pipelines"—2016.*

(Continued)

*Primary Examiner* — Francisco J Aponte
(74) *Attorney, Agent, or Firm* — Mintz Levin Cohn Ferris Glovsky and Popeo, P.C.

(57) ABSTRACT

A method may include receiving, from a client, a request to customize an operator node corresponding to a data processing operation. The request may include a first key. The operator node may be selected for inclusion in a graph representative of a data processing pipeline. The operator node may be associated with a first file that includes at least one configuration parameter associated with the operator node. The at least one configuration parameter may be associated with a second key. In response to the first key being determined to match the second key, the operator node may be customized by modifying the at least one configuration parameter. Furthermore, a second file associated with a customized operator node may be generated to store the customizations made to the operator node including the modification of the at least one configuration parameter. Related systems and articles of manufacture are also provided.

12 Claims, 7 Drawing Sheets

(56) References Cited

U.S. PATENT DOCUMENTS

| | | | | |
|---|---|---|---|---|
| 8,341,591 | B1* | 12/2012 | Knauth | G06F 8/71 |
| | | | | 705/7.13 |
| 8,682,701 | B1* | 3/2014 | Knauth | G06Q 10/06 |
| | | | | 705/7.11 |
| 9,335,976 | B1* | 5/2016 | Verwaest | G06F 8/315 |
| 9,823,950 | B1* | 11/2017 | Carrier | G06F 9/543 |
| 10,372,429 | B2* | 8/2019 | Wang | G06F 8/433 |
| 2006/0095894 | A1* | 5/2006 | Wilde | G06F 9/3851 |
| | | | | 717/113 |
| 2011/0276789 | A1* | 11/2011 | Chambers | G06F 9/3885 |
| | | | | 712/220 |
| 2011/0276962 | A1* | 11/2011 | Chambers | G06F 9/3885 |
| | | | | 718/1 |
| 2012/0079449 | A1* | 3/2012 | Sanderson | G06Q 10/103 |
| | | | | 717/102 |
| 2014/0032527 | A1* | 1/2014 | Chambers | G06F 9/3885 |
| | | | | 707/717 |
| 2014/0101150 | A1* | 4/2014 | Wang | G06F 16/24 |
| | | | | 707/736 |
| 2015/0178114 | A1* | 6/2015 | Chambers | G06F 9/3885 |
| | | | | 718/1 |
| 2015/0277900 | A1* | 10/2015 | O'Keeffe | G06F 8/70 |
| | | | | 717/113 |
| 2015/0372877 | A1* | 12/2015 | Tompkins | G06F 3/04842 |
| | | | | 715/736 |
| 2016/0103659 | A1* | 4/2016 | Tijanic | G06F 8/34 |
| | | | | 717/115 |
| 2017/0017797 | A1* | 1/2017 | Chambers | G06F 9/3885 |
| 2017/0242715 | A1* | 8/2017 | Chambers | G06F 9/3885 |
| 2018/0329967 | A1* | 11/2018 | Lee | G06F 16/27 |
| 2019/0384461 | A1* | 12/2019 | Seif | G06F 9/44505 |
| 2019/0384615 | A1* | 12/2019 | Kernert | G06F 9/44505 |
| 2019/0384635 | A1* | 12/2019 | Seif | G06F 9/5027 |
| 2020/0104970 | A1* | 4/2020 | White | G06T 1/60 |

OTHER PUBLICATIONS

Philipp Zehnder et al.: "Modeling Self-Service Machine-Learning Agents for Distributed Stream Processing"; 2017 IEEE International Conference on Big Data (BIGDATA).*

Dominik Riemer et al.: "SEPP: Semantics-Based Management of Fast Data Streams"; FZI Research Center for Information Technology Karlsruhe, Germany. 2014 IEEE 7th International Conference on Service-Oriented Computing and Applications.*

* cited by examiner

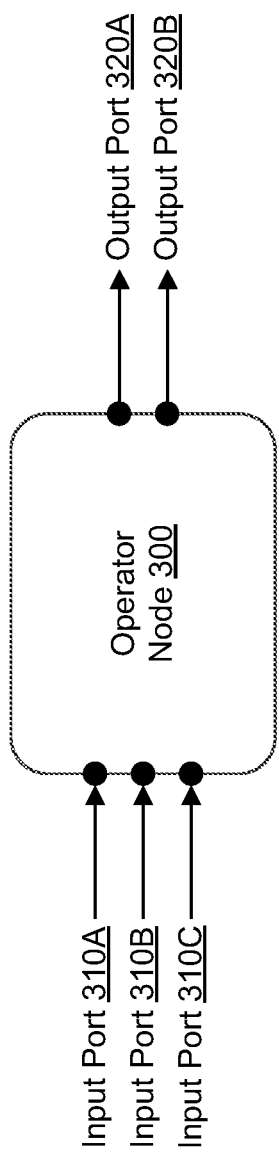

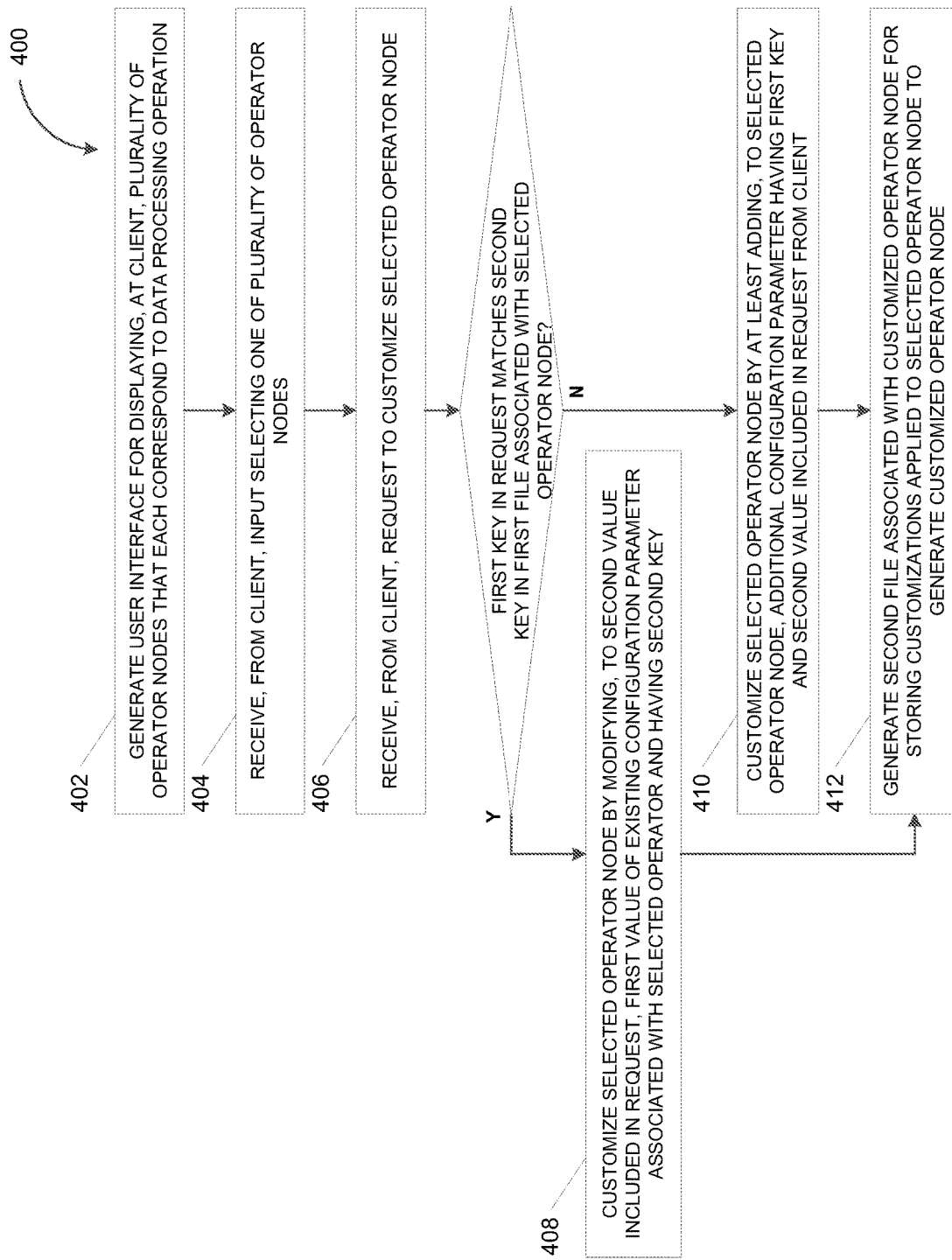

CUSTOMIZING OPERATOR NODES FOR GRAPHICAL REPRESENTATIONS OF DATA PROCESSING PIPELINES

TECHNICAL FIELD

The subject matter described herein relates generally to data processing and more specifically to a data processing pipeline editor.

BACKGROUND

Data processing may refer to the collection and/or manipulation of data including, for example, validation, sorting, summarization, aggregation, analysis, reporting, classification, and/or the like. But traditional data processing applications may be inadequate for handling exceptionally voluminous and/or complex data sets known as "big data." Instead, big data may require big data processing applications having advanced capabilities specifically tailored for the ingestion, cleansing, storage, analysis, sharing, transformation, and/or visualization of exceptionally voluminous and/or complex data sets.

SUMMARY

Systems, methods, and articles of manufacture, including computer program products, are provided for customizing an operator node in a graph representative of a data processing pipeline. In one aspect, there is provided a system including at least one data processor and at least one memory. The at least one memory may store instructions that cause operations when executed by the at least one data processor. The operations may include: receiving, from a client, a request to customize an operator node corresponding to a data processing operation, the request including a first key, and the operator node being selected for inclusion in a graph representative of a data processing pipeline; determining whether the first key matches a second key included in a first file associated with the operator node, the first file including at least a first configuration parameter associated with the operator node, and the first configuration parameter associated with the second key; and in response to the first key being determined to match the second key, customizing the operator node by at least modifying the first configuration parameter, and generating a second file associated with a customized operator node, the second file storing one or more customizations made to the operator node in order to generate the customized operator node, and the one or more customizations including the modification to the first configuration parameter.

In some variations, one or more features disclosed herein including the following features may optionally be included in any feasible combination. The request may further include a first value. The first file may include the first configuration parameter being associated with a second value. The modification to the first configuration parameter may include changing, to the first value, the second value associated with the first configuration parameter.

In some variations, in response to the first key being determined not to match the second key, the operator node may be customized by at least adding, to the operator node, a second configuration parameter, the second configuration parameter being associated with the first key. The second file may be generated to include the addition of the second configuration parameter.

In some variations, the first file may include a plurality of key-value pairs corresponding to a plurality of configuration parameters associated with the operator node. The plurality of configuration parameters may form a tree structure. The determination of whether the first key matches the second key may include traversing the tree structure.

In some variations, the one or more customization may be stored in the second file associated with the customized operator node instead of the first file associated with the operator node.

In some variations, the customized operator node may be added to the graph representative of the data processing pipeline. The customized operator node may correspond to a customized data processing operation. The addition of the customized operator node to the graph may include an addition of the customized data processing operation to a series of data processing operations included in the data processing pipeline. The corresponding data processing pipeline may be generated based at least on the graph. The data processing pipeline may include the customized data processing operation corresponding to the customized operator node. The data processing pipeline may be executed by at least applying, to the data stored in a database, the series of data processing operations including the customized data processing operation corresponding to the customized operator node.

In some variations, the first file and/or the second file may be a JavaScript Object Notation (JSON) file.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3A depicts an example of an operator node, in accordance with some example embodiments;

FIG. 4 depicts a flowchart illustrating a process for customizing an operator node, in accordance with some example embodiments.

When practical, similar reference numbers denote similar structures, features, or elements.

DETAILED DESCRIPTION

Figure 1:
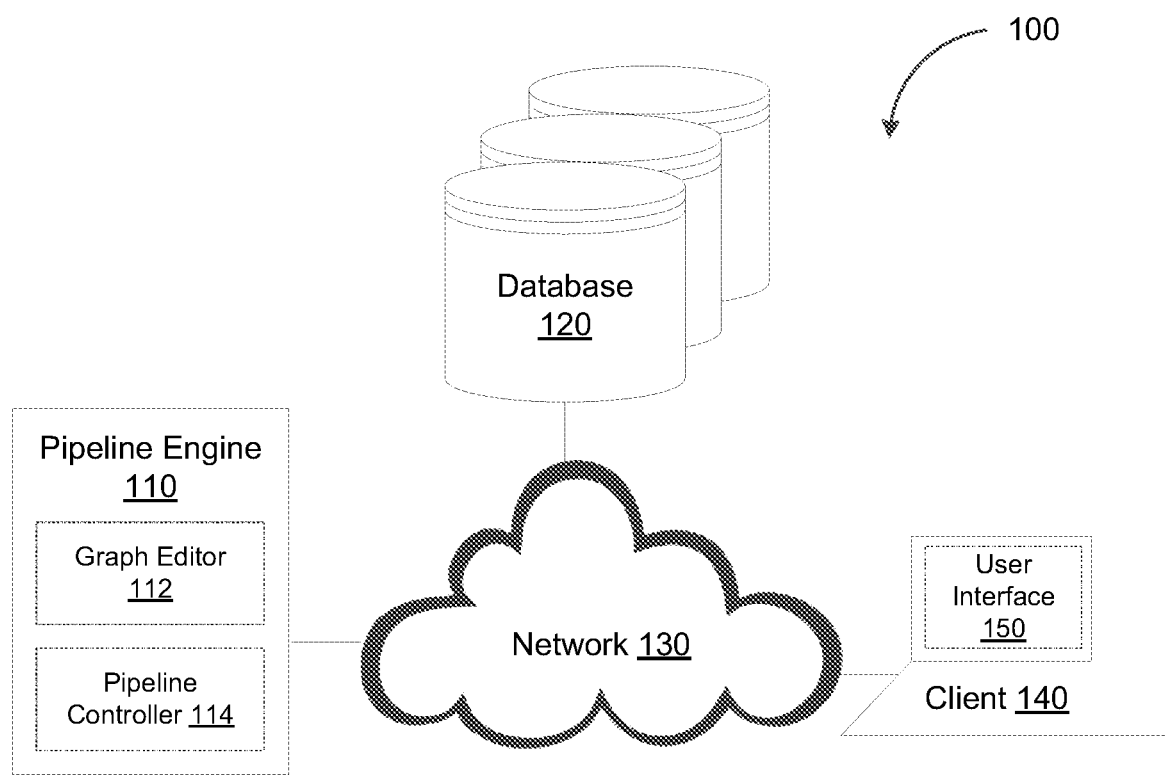
FIG. 1 depicts a system diagram illustrating a data processing pipeline generator system, in accordance with some example embodiments.

A data processing pipeline may include a series of operations for collecting and/or manipulating data including, for example, exceptionally voluminous and/or complex data sets known as "big data." The data processing pipeline may be represented graphically, for example, as a plurality of nodes interconnected by one or more directed edges. Each node may correspond to a data processing operation performed on the data traversing through the node. Meanwhile, a directed edge interconnecting two nodes may indicate a flow of data between the two nodes.

In some example embodiments, a data processing pipeline engine may be configured to support the construction of graphs that are representative of data processing pipelines. For example, the data processing pipeline engine may provide a plurality of default operator nodes, each of which having one or more predefined configuration parameters. Alternatively and/or additionally, the data processing pipeline engine may provide a plurality of customized operator nodes, at least some of which being generated by customizing a default operator including by, for example, modifying the predefined configuration parameters and/or adding additional configuration parameters. A graph representative of a data processing pipeline may be constructed by at least interconnecting, with one or more directed edges, a plurality of default operator nodes and/or customized operator nodes. The graph may form the basis for generating the corresponding data processing pipeline. Executing the data processing pipeline may include applying, to data stored in a database, a series of data processing operations corresponding to the operator nodes included in the graph representative of the data processing pipeline.

In some example embodiments, at least some of the default operator nodes provided by the data processing pipeline engine may be customized to generate customized operator nodes. Furthermore, at least some of the customized operator nodes may be subject to further customizations. For example, a default operator node and/or a customized operator node may be customized by modifying one or more current configuration parameters associated with the operator node. Alternatively and/or additionally, a default operator node and/or a customized operator node may be customized by adding, to the operator node, one or more additional configuration parameters. It should be appreciated that customizing an operator node may customize the corresponding data processing operation.

In some example embodiments, an operator node may be associated with a file, which may be a character file including, for example, a JavaScript Object Notation (JSON) file and/or the like. The file may store the values of the configuration parameters associated with the operator node. As such, according to some example embodiments, customizing the operator node may include generating, based at least on the character file, a separate file that includes the modified configuration parameters and/or the added configuration parameters.

In some example embodiments, a configuration parameter associated with a default operator node and/or a customized operator node may be assigned with a key. The key may uniquely identify the configuration parameter, thereby differentiating that configuration parameter from other configuration parameters. According to some example embodiments, the data processing pipeline engine may customize the operator node based at least on the keys associated with the current configuration parameters of the operator node. For example, the data processing pipeline engine may determine, based at least on the keys associated with the current configuration parameters, whether to modify a current configuration parameter and/or add an additional configuration parameter.

FIG. 1 depicts a system diagram illustrating a data processing pipeline generator system 100, in accordance with some example embodiments. Referring to FIG. 1, the data processing pipeline generator system 100 may include a pipeline engine 110. As shown in FIG. 1, the pipeline engine 110 may be communicatively coupled with a client 140, for example, via a network 130. The network 130 may be any wired and/or wireless network including, for example, a public land mobile network (PLMN), a wide area network (WAN), a local area network (LAN), a virtual local area network (VLAN), the Internet, and/or the like.

In some example embodiments, the client 140 may interact with the pipeline engine 110 to generate one or more data processing pipelines. For example, as shown in FIG. 1, the pipeline engine 110 may be associated with a user interface 150 configured to receive, at the client 140, one or more inputs for editing a graph representative of a data processing pipeline. Alternatively and/or additionally, the user interface 150 may also be configured to display, at the client 140, the graph representative of the data processing pipeline during, for example, the editing process.

Figure 2:
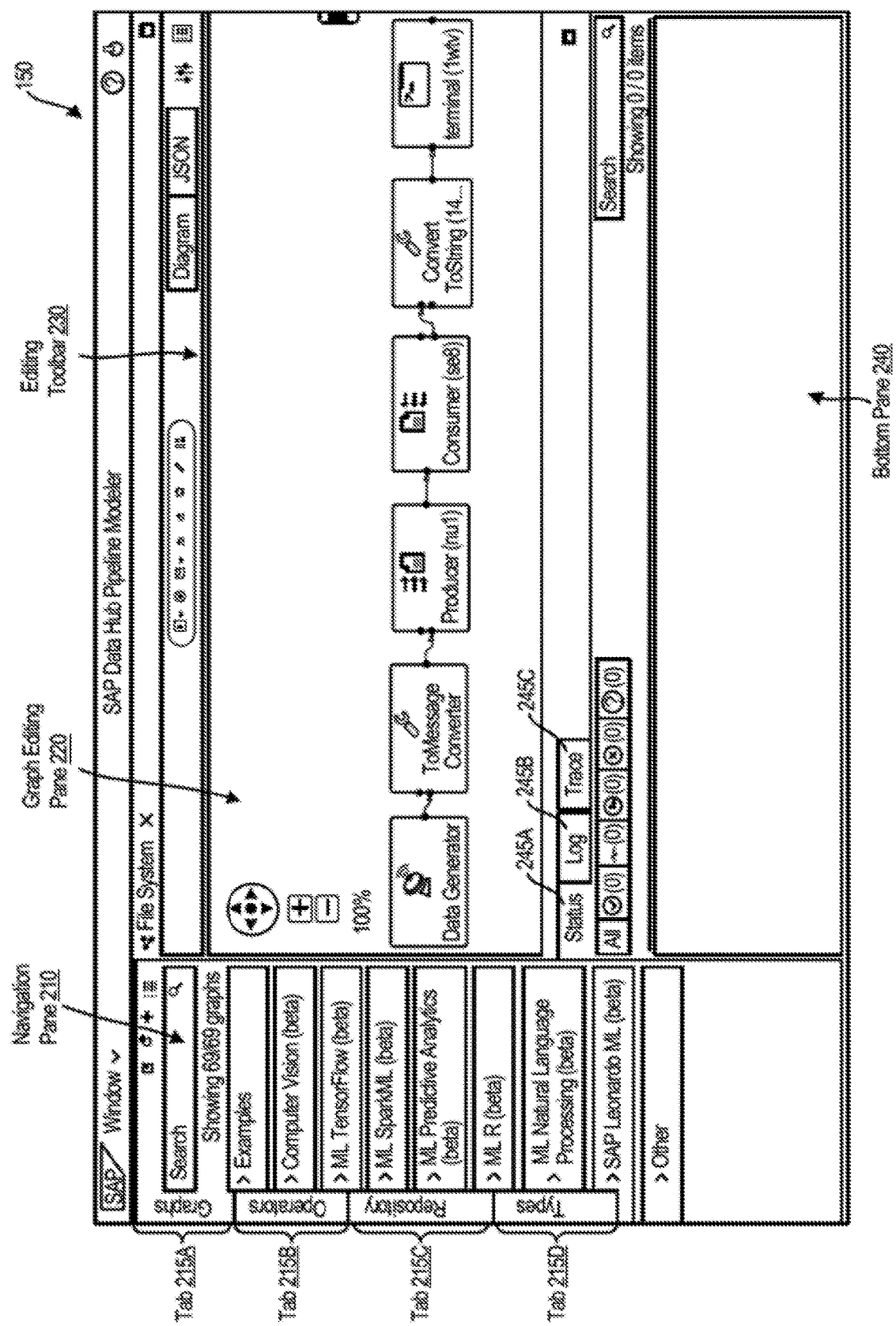
FIG. 2 depicts a user interface, in accordance with some example embodiments.

To further illustrate, FIG. 2 depicts the user interface 150. As shown in FIG. 2, the user interface 150 may include a navigation pane 210, a graph editing pane 220, an editing toolbar 230, and a bottom pane 240. In some example embodiments, the client 140 may access, via the navigation pane 210, one or more operator nodes, graphs, repositories, and/or types. For example, the navigation pane 210 may include a first tab 215A, a second tab 215B, a third tab 215C, and a fourth tab 215D. The client 140 may access, under the first tab 215A, a plurality of graphs representative of data processing pipelines. It should be appreciated that these graphs may include template graphs provided by the pipeline engine 110 and/or custom graphs created by the client 140. Meanwhile, the client 140 may access, under the second tab 215B, a plurality of default operator nodes provided by the pipeline engine 110 and/or customized operator nodes generated by the client 140.

Under the third tab 215C, the client 140 may access one or more repositories storing dockerfiles. A dockerfile may provide the runtime environment required for executing a data processing pipeline including, for example, the operations corresponding to the default operator nodes and/or customized operator nodes included in the data processing pipeline. Alternatively and/or additionally, the client 140 may access, under the fourth tab 215D, one or more types. As used herein, a type may refer to a data type including, for example, a string, an object, an array, a number, a Boolean, an integer, and/or the like. Each type may be associated with a definition (e.g., a JavaScript Object Notation (JSON) file) that includes the properties associated with the type. To further illustrate, Table 1 below depicts examples of data types and the corresponding properties. It should be appreciated that the input and/or output of an operator node may be associated with a type, which may determine the type of data that is ingested into and/or output by the operation corresponding to the operator node.

TABLE 1

| VALUE | DESCRIPTION |
| --- | --- |
| String | For properties of data type string, you can define helpers. These helpers enable users to easily identify and define the property values. In the Validation dropdown list, select a value. The tool provides format, predefined values, and services as helpers.<br>Format: You can choose from any of the supported formats such as date and time, URL, Password, or e-mail.<br>Predefined Values: You can preconfigure the property with list of values for users to choose. The property will be displayed to users as a dropdown list of values. In the Value field, provide the list of values.<br>Service: You can specify a URL to obtain the property values from the REST API. The tool displays the response from the service call as auto suggestions for the users. In the Url text field, specify the service URL.<br>Restriction<br>The response from the REST API must be an array of strings only. Also, the URL should be of same origin. Cross origin requests are not supported. |
| Object | For properties of data type object, you can specify the schema of the object by drilling down into the object definition. In the Schema Properties section, double-click the property to drill-down further and to modify the object definition. |
| Custom | Custom data types enable you to set the data type of a property to another user defined type. In the Type dropdown list, select a value. The tool populates the dropdown list with the global schema types. |
| Array | For properties of data type array, you can specify the data types of items in the array. In the Item Type dropdown list, select a value. The tool supports string. Number, and object as data types for array items. |
| Number | For properties of data type number, users can provide numbered values to the property. |
| Boolean | For properties of data type Boolean, users can provide Boolean values to the property. |
| Integer | For properties data type integer, users can provide integer values to the property. |

Referring again to FIG. 2, the client 140 may use the graph editing pane 220 to create a graph representative of a data processing pipeline. For example, as shown in FIG. 2, the client 140 may construct a graph by at least adding and/or removing operator nodes from the graph editing pane 220. The client 140 may select, for instance, a default operator node and/or a customized operator node from under the second tab 215B of the navigation pane 210. In some example embodiments, commands for editing the graph displayed in the graph editing pane 220 may be selected via the editing toolbar 230. For example, the client 140 may customize an operator node added to and displayed in the graph editing pane 220 by selecting, from the editing toolbar 230, a command to customize the configurations of the operator node.

Alternatively and/or additionally, the client 140 may interconnect the operator nodes added to and displayed in the graph editing pane 220 by adding one or more directed edges. For example, the client 140 may interconnect a first operator node and a second operator node displayed in the graph editing pane 220 by selecting an output port on the first operator node and dragging a cursor from the selected output port to an input port on the second operator node.

In some example embodiments, the bottom pane 240 may include a status tab 245A, a log tab 245B, and a trace tab 245C. The client 140 may access, via the status tab 245A, the log tab 245B, and/or the trace tab 245C, a corresponding pane that displays a status of executing a data processing pipeline, which may correspond, for example, to a graph constructed and/or displayed in the graph editing pane 220.

Referring again to FIG. 1, the pipeline engine 110 may include a graph editor 112 and a pipeline controller 114. In some example embodiments, the graph editor 112 may support the construction of graphs, which may represent one or more data processing pipelines. Meanwhile, the pipeline controller 114 may generate, based on a graph constructed via the graph editor 112, a corresponding data processing pipeline.

As noted, a data processing pipeline may include a series of operations for collecting and/or manipulating data. For instance, the data processing pipeline may include a series of operations for collecting and/or manipulating data stored in one or more databases including, for example, a database 120. It should be appreciated that the database 120 may be any type of database including, for example, an in-memory database, a hierarchical database, an object database, an object-relational database, a non-Structured Query Language (NoSQL) database, and/or the like. For example, the database 120 may be a relational database, a graph database, a column store, a key-value store, a document store, and/or the like.

According to some example embodiments, the graph editor 112 may provide a plurality of operator nodes including, for example, default operator nodes and/or customized operator nodes. An operator node may include one or more input ports and/or output ports, through which the operator node may be interconnected with other operator nodes to form a graph representative of a data processing pipeline. Furthermore, an operator node may be associated with an operation, which may be performed on the data traversing through the operator node. For example, an operator node may be configured, by default and/or through customization, to serve as connectors to messaging systems, connectors to store and read data, connectors to databases, engines for manipulating arbitrary data, processor operators for executing any program, type converters, digital signal processors, image processors, machine learning models, and/or the like.

In some example embodiments, the client 140 may select, for example, via the user interface 150, one or more default operator nodes to add to a graph that is representative of a data processing pipeline. At least some of the plurality of default operator nodes provided by the graph editor 112 may be customized by the client 140. For instance, the client 140 may customize a default operator node by modifying a predefined configuration parameter of the default operator node, for example, by changing a value associated with the predefined configuration parameter to a value specified by the client 140. Alternatively and/or additionally, the default operator node may be customized by adding additional configuration parameters to the default operator node. To further illustrate, Table 2 below depicts examples of configuration parameters and values associated with various operator nodes in a data processing pipeline for performing text analysis.

TABLE 2

| OPERATOR | CONFIGURATION PARAMETER | VALUE |
| --- | --- | --- |
| HDF S Consumer (Operator id: hdfsconsumer2) | path | Path to the folder on HDFS to be tokenized |
| | hadoopUser | Username to logon to the HDFS server |
| | hadoopNameNode | Host name and port number of the HDFS server |
| | pollPeriodInMs | Interval between two content change detection events, must be >=1000 |
| | onlyReadOnChange | true |
| | Recursive | True |
| HDFS Producer (Operator id: oldhdfsproducerI) | hadoopUser | Username to logon to the HDFS server (must be the same as in hdfsconsumer2) |
| | hadoopNameNode | Host name and port number of the HDFS server (must be the same as in hdfsconsumer2) |
| HDFS Producer (Operator id: oldhdfsproducer2) | hadoopUser | Username to logon to the HDFS server (must be the same as in hdfsconsumer2) |
| | hadoopNameNode | Host name and port number of the HDFS server (must be the same as in hdfsconsumer2) |
| Webservices (Operator id: javascriptoperatorI) | service | One of the following service types: EntityExtraction4 LanguageIdentificationdir LinguisticAnalysis# EnterpriseFactExtraction4 PublicSectorFactExtraction4 SentimentAnalysis# |
| OpenAPI Client (Operator id: openapickentI) | apiKeyValue | The API key |
| JavaScript Operator2 (Operator id: javascriptoperator21) | WriteLogFile | If true, a log file with possible messages from the API server is written in the HDFS server |

FIG. 3A depicts an operator node 300, in accordance with some example embodiments. Referring to FIGS. 1-2 and 3A, the operator node 300 may be a default operator node provided by the pipeline engine 110 and associated with one or more predefined configuration parameters. Alternatively and/or additionally, the operator node 300 may be a customized operator node created by the client 140. In some example embodiments, the operator node 300 may be accessed, for example, by the client 140, under the second tab 215B. For example, the client 140 may select the operator node 300 in order to add the operator node 300 to a graph representative of a data processing pipeline. The client 140 may further select the operator node 300 in order to customize the operator node 300 including by, for example, modifying one or more existing configuration parameters of the operator node 300 and/or adding additional configuration parameters to the operator node 300.

In some example embodiments, the operator node 300 may be associated with a file, which may be a character file including, for example, a JavaScript Object Notation (JSON) file and/or the like. The file may store the configuration parameters of the operator node 300. As such, the file may include one or more key-value pairs, each of which corresponding to a configuration parameter of the operator node 300. For example, each configuration parameter may be associated with a unique key in order enable a differentiation between the different configuration parameters associated with the operator node 300. As such, each key-value pair may include the key and the values associated with one of the configuration parameters of the operator node 300.

Figure 3B:
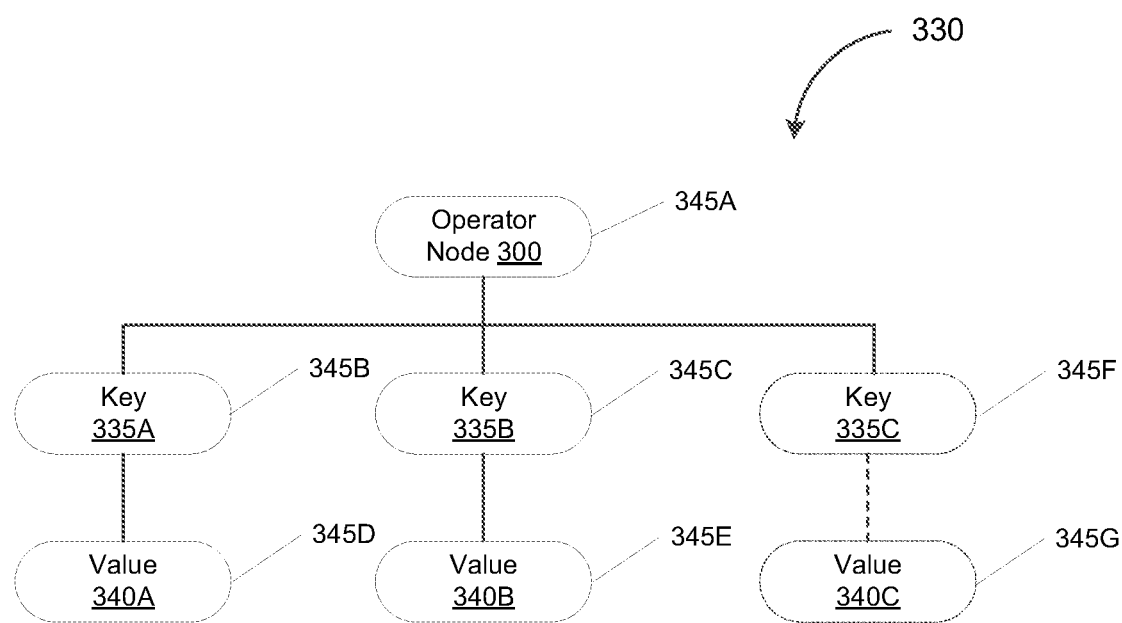
FIG. 3B depicts a tree hierarchy associated with an operator node, in accordance with some example embodiments.

The configuration parameters stored in the file may form a hierarchy such as, for example, a tree and/or the like. To further illustrate, FIG. 3B depicts a tree structure 330 associated with the operator node 300, in accordance with some example embodiments. Referring to FIG. 3A-B, the operator node 300 may be associated with a plurality of configuration parameters including, for example, a first configuration parameter and/or a second configuration parameter. The first configuration parameter and the second configuration parameter may each be associated with a unique key that enables a differentiation between at least the first configuration parameter and the second configuration parameter. For example, the first configuration parameter may be associated with a first key 335A while the second configuration parameter may be associated with a second key 335B. Alternatively and/or additionally, each of the first configuration parameter and the second configuration parameter may be associated with one or more values. For instance, the first configuration parameter may be associated with a first value 340A and the second configuration parameter may be associated with a second value 340B.

In some example embodiments, the first configuration parameter, the second configuration parameter, and the third configuration parameter may form a hierarchy including, for example, the tree structure 330. For example, as shown in FIG. 3B, the tree structure 330 may include a plurality of nodes including, for example, a first node 345A, a second node 345B, a third node 345C, a fourth node 345D, and a fifth node 345E. The first node 345A may be a root node of the tree structure 330 and may correspond to the operator node 300. Meanwhile, the second node 345B and the third node 345C may each correspond to the key associated with one of the configuration parameters of the operator node 300. Alternatively and/or additionally, the fourth node 345D and the fifth node 345E may each correspond to the value associated with one of the configuration parameters of the operator node 300.

For instance, as shown in FIG. 3B, the second node 345B may correspond to the first key 335A and the third node 345C may correspond to the second key 335B. The second node 345B and the third node 345C may both be children nodes descending from the first node 345A. Alternatively and/or additionally, the fourth node 345D may correspond to the first value 340A while the fifth node 345E may correspond to the second value 340B. The fourth node 345D may be a child node descending from the second node 345B because the fourth node 345D may correspond to the first value 340A, which may form a key-value pair with the first key 335A associated with the second node 345B. Likewise, the fifth node 345E may be a child node descending from the third node 345C because the fifth node 345E may correspond to the second value 340B, which may form a key-value pair with the second key 335B associated with the third node 345C.

In some example embodiments, the operator node 300 may be customized by modifying one of the existing configuration parameters of the operator node 300 including, for example, the first configuration parameter and/or the second configuration parameter. For example, the operator node 300 may be customized by modifying the first value 340A associated with the first configuration parameter and/or the second value 340B associated with the second configuration parameter. According to some example embodiments, the pipeline engine 110, for example, the graph editor 112, may determine to modify the first configuration parameter and/or the second configuration parameter if the request from the client 140 includes one or more keys that match the first key 335A associated with the first configuration parameter and/or the second key 335B associated with the second configuration parameter. For instance, in response to the request from the client 140 to customize the operator node 300, the pipeline engine 110, for example, the graph editor 112, may traverse the tree structure 300 in order to determine whether the keys included in the request from the client 140 match any of the keys included the tree structure 300.

Alternatively and/or additionally, the operator node 300 may be customized by adding, to the operator node 300, one or more additional configuration parameters. For instance, the operator node 300 may be customized by adding a third configuration parameter to the operator node 300. In some example embodiments, the pipeline engine 110, for example, the graph editor 112, may determine to add the third configuration parameter if the request from the client 140 includes one or more keys that fail to match the first key 335A associated with the first configuration parameter and/or the second key 335B associated with the second configuration parameter. It should be appreciated that the addition of the third configuration parameter may trigger the addition of a sixth node 345F and a seventh node 345G to the tree structure 300. The sixth node 345F may correspond to a third key 335C associated with the third configuration parameter while the seventh node 345G may correspond to a third value 340C associated with the third configuration parameter.

In some example embodiments, the pipeline engine 110, for example, the graph editor 112, may be configured to implement a noninvasive and/or nondestructive technique for customizing operator nodes. For instance, the pipeline engine 110, for example, the graph editor 112, may customize the operator node 300 by generating a separate file (e.g., a JavaScript Object Notation (JSON) file and/or the like). The separate file may include a replica of the contents of the original file associated with the operator node 300. Alternatively and/or additionally, the separate file may include the customizations made to the operator node 300 including, for example, the modified first configuration parameter, the modified second configuration parameter, and/or the added third configuration parameter. Generating the separate file for storing the customizations to the operator node 300 may obviate the customizations from being applied directly to the original file associated with the operator node 300 which, as noted, may include the existing configuration parameters of the operator node 300. As such, the operator node 300 may be customized without altering and/or destroying the original file associated with the operator node 300.

Referring again to FIG. 3A, the operator node 300 may include one or more input ports including, for example, a first input port 310A, a second input port 310B, and/or a third input port 310C. Alternatively and/or additionally, the operator node 300 may include one or more output ports including, for example, a first output port 320A and/or a second output port 320B. In some example embodiments, the operator node 300 may be interconnected, via the input ports and/or the output ports, with one or more other operator nodes to form the graph representative of the data processing pipeline. For example, the client 140 may connect the operator node 300 to another operator node by selecting the first output port 320A and/or the second output port 320B, and dragging a cursor from the first output port 320A and/or the second output port 320B to one or more input ports of the other operator node. The client 140 may also connect the operator node 300 to another operator node by selecting one or more output ports on the other operator node and dragging a cursor from these output ports to the first input port 310A, the second input port 310B, and/or the third input port 310C of the operator node 300. In doing so, the client 140 may connect the operator node 300 to one or more operator nodes with directed edges indicating the flow of data to and/or from the operator node 300.

In some example embodiments, an output port may be connected to an input port if the output port and the input port are associated with compatible types. The pipeline engine 110 may provide visual indications that enables a visual differentiation between compatible ports and incompatible ports. For example, compatible ports may be displayed, for example, in the user interface 150, using the same color and/or icons. As noted, a type may refer to a data type including, for example, a string, an object, an array, a number, a Boolean, an integer, and/or the like. Accordingly, the first input port 310A, the second input port 310B, and/or the third input port 310C of the operator node 300 may interconnected to the output ports of the other operator node if the ports are associated with compatible types. Similarly, the first output port 320A and/or the second output port 320B may be interconnected to the input ports of the other operator node if the ports are associated with compatible types.

Table 3 below depicts examples of compatible port types. For instance, an input port having the type "string.com" may be compatible with an output port having the type "string.com.sap." As such, an input port having the type "string.com" may be interconnected with an output port having the type "string.com.sap." In some example embodiments, the pipeline engine 110 may display the input port having the type "string.com" and the output port having the type "string.com.sap," for example, in the user interface 150, using the same color and/or icon in order to indicate the compatibility between these two ports. Furthermore, the interconnection between the input port and the output port may, for example, by a directed edge. The directed edge may originate from the output port and terminate at the input port, thereby indicating a flow of data from the output port into the input port.

TABLE 3

| INPUT PORT TYPES | OUTPUT PORT TYPES |
|---|---|
| any | any |
| any | any.* |
| any | string |
| any.* | string.* |
| any.* | string.com.sap |
| any.* | string.com.sap.* |
| Any.com.sap | any.com.sap |
| String.com.* | string.com.sap.* |

Table 4 below depicts examples of incompatible port types. For example, an input port having the type "float64." may be incompatible with an output port having the type "int64." As such, an input port having the type "float64." may be not interconnected with an output port having the type "int64." In some example embodiments, the pipeline engine 110 may display the input port having the type "float64." and the output port having the type "int64," for example, in the user interface 150, using different colors and/or icons in order to indicate the incompatibility between these two ports.

TABLE 4

| INPUT PORT TYPES | OUTPUT PORT TYPES |
|---|---|
| any | any.com |
| any | any.com* |
| float64.* | int64.* |
| stream | any |

Figure 3C:
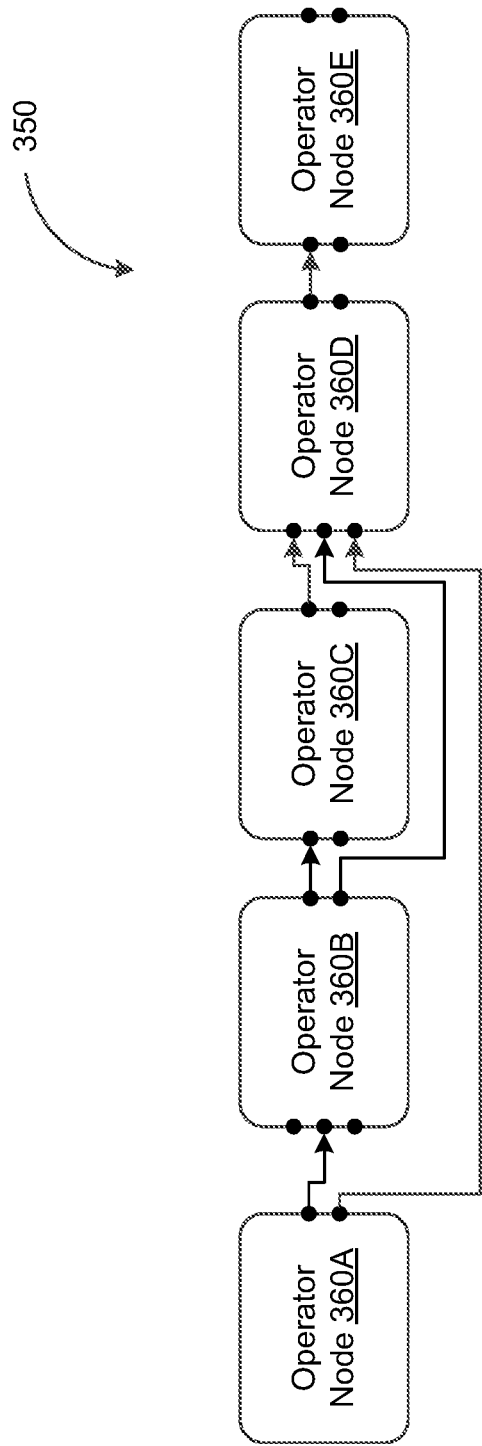
FIG. 3C depicts an example of a graph representative of a data processing pipeline, in accordance with some example embodiments.

FIG. 3C depicts a graph 350 representative of a data processing pipeline, in accordance with some example embodiments. Referring to FIG. 3C, the graph 350 may include a plurality of operator nodes including, for example, a first operator node 360A, a second operator node 360B, a third operator node 360C, a fourth operator node 360D, and/or a fifth operator node 360E. Each of the first operator node 360A, the second operator node 360B, the third operator node 360C, the fourth operator node 360D, and/or the fifth operator node 360E may correspond to a data processing operation performed on the data traversing through each individual operation node.

Furthermore, as FIG. 3C shows, the first operator node 360A, the second operator node 360B, the third operator node 360C, the fourth operator node 360D, and/or the fifth operator node 360E may be interconnected via one or more directed edges, each of which indicating a flow of data to and/or from the individual operator nodes. As noted, a first operator node may be interconnected to a second operator node by selecting an output port on the first operator node and dragging a cursor from the output port to an input port on the second operator node. For instance, the first operator node 360A may be interconnected to the fourth operator node 360D by selecting an output port on the first operator node 360A and dragging a cursor from the output port on the first operator node 360A to an input port on the fourth operator node 360D. According to some example embodiments, the first operator node 360A may be interconnected with the fourth operator node 360D if the output port on the first operator node 360A and the input port on the fourth operator node 360D are associated with compatible types.

FIG. 4 depicts a flowchart illustrating a process 400 for customizing an operator node, in accordance with some example embodiments. Referring to FIGS. 1-2, 3A-C, and 4, the process 400 may be performed by the pipeline engine 110 in order to customize, for example, the operator node 300. As noted, the data processing pipeline may include a series of operations for collecting and/or manipulating data stored in one or more databases including, for example, the database 120. In some example embodiments, the customized operator node 300 may be added to the graph 350, which may be representative of a corresponding data processing pipeline. Adding the customized operator node 300 to the graph 350 may add, to the series of operations included in the data processing pipeline, a customized data processing operation corresponding to the customized operator node 300.

At 402, the pipeline engine 110 may generate a user interface for displaying, at the client 140, a plurality of operator nodes that each correspond to a data processing operation. For example, the pipeline engine 110, for example, the graph editor 112, may generate the user interface 150. The user interface 150 may display, at the client 140, a plurality of operator nodes including, for example, the operator node 300. As noted, the operator node 300 may be a default operator node provided by the pipeline engine 110 and/or a customized operator node created by the client 140. In some example embodiments, the client 140 may access the plurality of operator nodes under the second tab 215 in the navigation pane 210 of the user interface 150. As noted, each of the plurality of operator nodes may be configured, by default and/or through customization, to server as connectors to messaging systems, connectors to store and read data, connectors to databases, engines for manipulating arbitrary data, processor operators for executing any program, type converters, digital signal processors, image processors, machine learning models, and/or the like.

At 404, the pipeline engine 110 may receive, from the client 140, an input selecting one of the plurality of operator nodes. Furthermore, at 406, the pipeline engine 110 may receive, from the client 140, a request to customize the selected operator node. For example, the client 140 may select the operator node 300 via the user interface 150. Selecting the operator node 300 may add the operator node 300 to the graph 350, which may correspond to a data processing pipeline that includes a series of data collection and/or manipulation operations. As noted, the graph 350 may form the basis for generating the corresponding data processing pipeline. Furthermore, executing the data processing pipeline may include applying, to data stored in a database, a series of data processing operations corresponding to the operator nodes included in the graph 350 including, for example, the operator node 300. In some example embodiments, the client 140 may further, via the user interface 150, request to customize the operator node 300 such that the operator node 300 added to the graph 350 may include one or more customizations specified by the client 140 including, for example, modifications to one or more existing configuration parameters associated with the operator node 300 and/or additions of one or more additional configuration parameters to the operator node 300.

At 407, the pipeline engine 110 may respond to the request by at least determining whether a first key included in the request matches a second key included in a first file associated with the selected operator node. For example, in some example embodiments, the operator node 300 may be associated with a file, which may be a character file including, for example, a JavaScript Object Notation (JSON) file and/or the like. The file may store one or more existing configuration parameters associated with the operator node 300. For instance, as noted, each configuration parameter may correspond to a key-value pair included in the file. As such, each key-value pair included in the file associated with the operator node 300 may include the key and the values associated with one of the configuration parameters of the operator node 300. The key associated with a configuration parameter may be unique to that configuration parameter, thereby enabling a differentiation between the different configuration parameters associated with the operator node 300.

At 407-Y, the pipeline engine 110 may determine that the first key included in the request matches the second key included in the first file associated with the selected operator node. For example, the client 140 may request to modify one of the existing configuration parameters associated with the operator node 300. As such, the request from the client 140 may specify a key that is identical to a key associated with one of the existing configuration parameters of the operator node 300. In some example embodiments, the pipeline engine 110, for example, the graph editor 112, may determine that the key specified in the request matches a key included in the file associated with the operator node 300 by at least traversing the tree structure 330. Referring to FIG. 3C, the tree structure 300 may correspond to the hierarchy formed by the configuration parameters included in the file (e.g., JavaScript Object Notation (JSON) file) associated with the operator node 300.

At 408, in response to the first key being determined to match the second key, the pipeline engine 110 may customize the selected operator node by at least modifying, to a second value included in the request from the client, a first value of an existing configuration parameter of the selected operator node that is associated with the second key. For example, where the key specified in the request from the client 140 matches a key included in the file associated with the operator node 300, the pipeline engine 110, for example, the graph editor 112, may determine that the client 140 is requesting to modify one of the existing configuration parameters of the operator node 300. Accordingly, the pipeline engine 110 may determine to modify the configuration parameter associated with the key. The modifications may include, for example, changing the existing value of the configuration parameter to a different value specified in the request from the client 140.

Alternatively and/or additionally, at 407-N, the pipeline engine 110 may determine that the first key included in the request does not match the second key included in the first file associated with the selected operator node. For example, the client 140 may request to add a configuration parameter to the operator node 300 instead of and/or in addition to modifying one of the existing configuration parameters of the operator node 300. As such, at 410, the pipeline engine 110 may customize the selected operator node by at least adding, to the selected operator node, an additional configuration parameter having the first key and a second value included in the request. For instance, where the key specified in the request from the client 140 fails to match any of the keys included in the file associated with the operator node 300, the pipeline engine 110, for example, the graph editor 112, may determine that the client 140 is request to add additional configuration parameters to the operator node 300. Accordingly, the pipeline engine 110 may add, to the operator node 300, the key and the values specified in the request from the client 140. The key and the values may form a new key-value pair corresponding to the configuration parameter being added to the operator node 300.

At 412, the pipeline engine 110 may generate a second file associated with the customized operator node for storing the customizations applied to the selected operator node to generate the customized operator node. In some example embodiments, the pipeline engine 110, for example, the graph editor 112, may customize the operator node 300 in a noninvasive and/or nondestructive manner. For instance, as noted, the pipeline engine 110 may generate a separate file (e.g., a JavaScript Object Notation (JSON) file) for storing the customizations to the operator node 300 including, for example, any modifications to the existing configuration parameters of the operator node 300 and/or additional configuration parameters added to the operator node 300. The separate file may be associated with the customized operator node, which may be generated as a result of customizing the operator node 300.

Figure 5:
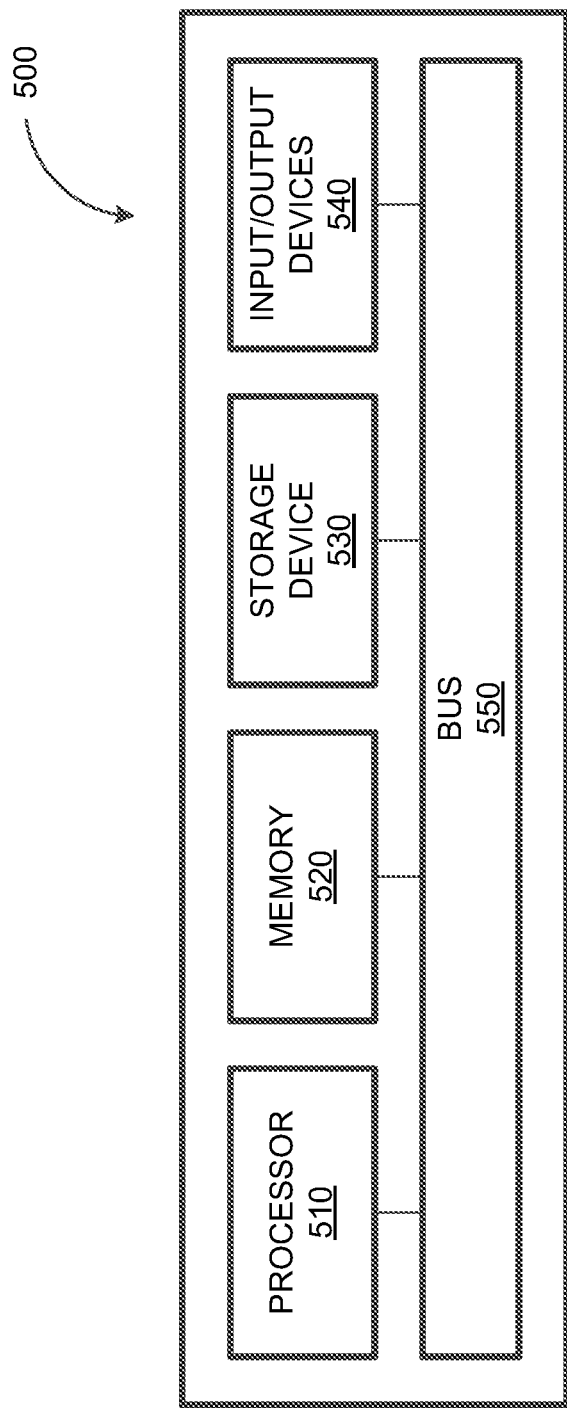
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the pipeline engine 110 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the pipeline engine 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a solid state drive, a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random query memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   receiving, from a client, a request to customize an operator node corresponding to a data processing operation, the request including a first key and a first value, the operator node being selected for inclusion in a graph representative of a data processing pipeline, and the operator node associated with a plurality of configuration parameters, wherein the plurality of configuration parameters forms a tree structure;
   determining, by traversing the tree structure, whether the first key matches a second key included in a first file associated with the operator node, the first file including a first configuration parameter associated with the operator node, the first configuration parameter associated with the second key and a second value;
in response to the first key being determined to match the second key, customizing the operator node by changing the second value associated with the first configuration parameter to the first value, the first value specified by the request, and generating a second file associated with a customized operator node, the second file storing one or more customizations made to the operator node in order to generate the customized operator node, and the one or more customizations including a modification to the first configuration parameter;
adding, to the graph representative of the data processing pipeline, the customized operator node, the customized operator node corresponding to a customized data processing operation, and the addition of the customized operator node to the graph comprising an addition of the customized data processing operation to a series of data processing operations included in the data processing pipeline; and
generating, based at least on the graph, the corresponding data processing pipeline, the data processing pipeline including the customized data processing operation corresponding to the customized operator node.

2. The system of claim 1, further comprising:
in response to the first key being determined not to match the second key,
customizing the operator node by at least adding, to the operator node, a second configuration parameter, the second configuration parameter being associated with the first key, and
generating the second file to include the addition of the second configuration parameter.

3. The system of claim 1, wherein the first file includes a plurality of key-value pairs corresponding to the plurality of configuration parameters associated with the operator node.

4. The system of claim 1, wherein the one or more customization are stored in the second file associated with the customized operator node instead of the first file associated with the operator node.

5. The system of claim 1, further comprising:
executing the data processing pipeline by at least applying, to the data stored in a database, the series of data processing operations including the customized data processing operation corresponding to the customized operator node.

6. The system of claim 1, wherein the first file and/or the second file comprise a JavaScript Object Notation (JSON) file.

7. A computer-implemented method, comprising:
receiving, from a client, a request to customize an operator node corresponding to a data processing operation, the request including a first key and a first value, the operator node being selected for inclusion in a graph representative of a data processing pipeline, and the operator node associated with a plurality of configuration parameters, wherein the plurality of configuration parameters forms a tree structure;
determining, by traversing the tree structure, whether the first key matches a second key included in a first file associated with the operator node, the first file including a first configuration parameter associated with the operator node, the first configuration parameter associated with the second key and a second value;
in response to the first key being determined to match the second key, customizing the operator node by changing the second value associated with the first configuration parameter to the first value, the first value specified by the request, and generating a second file associated with a customized operator node, the second file storing one or more customizations made to the operator node in order to generate the customized operator node, and the one or more customizations including the modification to the first configuration parameter;
adding, to the graph representative of the data processing pipeline, the customized operator node, the customized operator node corresponding to a customized data processing operation, and the addition of the customized operator node to the graph comprising an addition of the customized data processing operation to a series of data processing operations included in the data processing pipeline; and
generating, based at least on the graph, the corresponding data processing pipeline, the data processing pipeline including the customized data processing operation corresponding to the customized operator node.

8. The method of claim 7, further comprising:
in response to the first key being determined not to match the second key,
customizing the operator node by at least adding, to the operator node, a second configuration parameter, the second configuration parameter being associated with the first key, and
generating the second file to include the addition of the second configuration parameter.

9. The method of claim 7, wherein the first file includes a plurality of key-value pairs corresponding to the plurality of configuration parameters associated with the operator node.

10. The method of claim 7, wherein the one or more customization are stored in the second file associated with the customized operator node instead of the first file associated with the operator node.

11. The method of claim 7, further comprising:
executing the data processing pipeline by at least applying, to the data stored in a database, the series of data processing operations including the customized data processing operation corresponding to the customized operator node.

12. A non-transitory computer-readable medium storing instructions, which when executed by at least one data processor, result in operations comprising:
receiving, from a client, a request to customize an operator node corresponding to a data processing operation, the request including a first key and a first value, the operator node being selected for inclusion in a graph representative of a data processing pipeline, and the operator node associated with a plurality of configuration parameters, wherein the plurality of configuration parameters forms a tree structure;
determining, by traversing the tree structure, whether the first key matches a second key included in a first file associated with the operator node, the first file including a first configuration parameter associated with the operator node, the first configuration parameter associated with the second key and a second value;
in response to the first key being determined to match the second key, customizing the operator node by changing the second value associated with the first configuration parameter to the first value, the first value specified by the request, and generating a second file associated with a customized operator node, the second file storing one or more customizations made to the operator node in order to generate the customized operator node, and the one or more customizations including the modification to the first configuration parameter;

adding, to the graph representative of the data processing pipeline, the customized operator node, the customized operator node corresponding to a customized data processing operation, and the addition of the customized operator node to the graph comprising an addition of the customized data processing operation to a series of data processing operations included in the data processing pipeline; and generating, based at least on the graph, the corresponding data processing pipeline, the data processing pipeline including the customized data processing operation corresponding to the customized operator node.

* * * * *